Patented Feb. 23, 1954

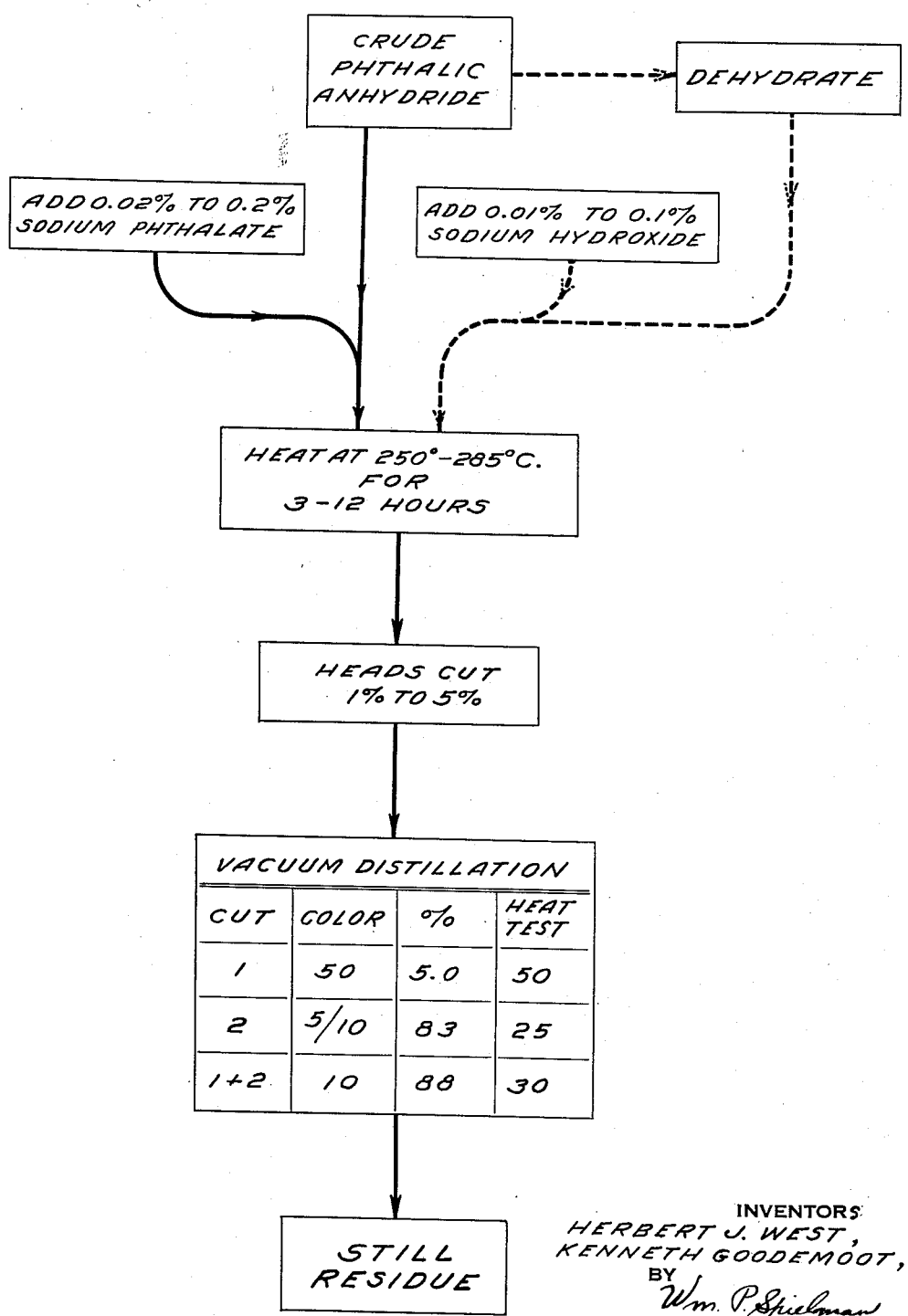

2,670,325

UNITED STATES PATENT OFFICE 2,670,325

DISTILLATION PURIFICATION OF PHTHALIC ANHYDRIDE

Herbert J. West, Pittsburgh, and Kenneth Goodemoot, Bridgeville, Pa., assignors to American Cyanamid Company, New York, N. Y., a corporation of Maine Application July 14, 1951, Serial No. 236,726

3 Claims. (Cl. 202—57)

This invention relates to the purification of crude phthalic anhydride by a combined heat treatment and fractional distillation procedure.

In the commercial production of pure phthalic anhydride it was previously the practice to subject the crude condensate from the catalytic converters to two separate distillation procedures. The phthalic anhydride converter product, containing color-forming and odor-forming impurities, was first heat treated for some 16 to 24 hours and was then subjected to a total distillation. The distillate was then revaporized and the vapors were subjected either to fractionation or to fractional condensation to produce a phthalic anhydride product of commercially acceptable purity.

Our present invention is directed to a modification of this procedure in which the preliminary heat treatment is greatly shortened and the intermediate total distillation is entirely eliminated. We have found that when the heat treatment is carried out in the presence of very small amounts of alkali metal phthalates, which are hereinafter described as catalytic quantities, several unexpected advantages are obtained. In the first place, the heat treatment at approximately the boiling point of phthalic anhydride (about 280–285° C.) can be reduced to about ⅓ to ½ of its former duration. Secondly, the presence of alkali metal phthalate in catalytic amounts obviates the necessity of an intermediate total distillation if a heads cut is taken; in other words, the mixture obtained by heat treatment in the presence of the alkali metal phthalate can be subjected directly to a fractional distillation provided the benzoic acid contant of the converter product is removed as a heads cut.

Our invention will be described in greater detail with reference to the attached drawing, the single figure of which is a flow sheet illustrating preferred embodiments thereof. Referring to this drawing, it will be seen that the raw material used is designated as crude phthalic anhydride. As is well known to those skilled in the art, this crude is obtained commercially by the vapor phase catalytic oxidation of naphthalene or ortho-xylene, the vapors of these hydrocarbons in admixture with air being passed over a vanadium catalyst at temperatures of 300–500° C. The character and quantity of the color-forming and odor-forming impurities in the converter product vary with the particular hydrocarbon employed; when naphthalene is oxidized over a fixed catalyst at temperatures of 400–500° C. or higher the resulting gases contain alphanaphthoquinone but have a considerably less content of maleic anhyride and benzoic acid than when commercial orthoxylene mixtures are employed. When lower oxidation temperatures are used, as when the fluidized catalyst technique is employed, a converter product of higher purity is usually obtained. The amount of impurities in the converter product also depends very much upon the particular condensation procedures employed; thus, when fractional condensation of the type described in U. S. Patent No. 2,455,314 is used, typical condenser products have the following analysis:

| Hydrocarbon Used | Percent Benzoic Acid | Percent Maleic Acid | Percent Phthalic Anhydride |
|---|---|---|---|
| Naphthalene | 0.03 | 0.4 | 99.7 |
| Orthoxylene | [1] 0.4 | 1.7 | 96.9 |

[1] Presumably toluic acid.

In accordance with the present invention, the heat treatment of either of these crudes is carried out in the presence of catalytic quantities of alkali metal phthalate within the range of approximately 0.02% to 0.2%, based on the weight of the crude. By "alkali metal phthalate" we mean, of course, a phthalic acid salt of an alkali metal; i. e., lithium, sodium, potassium, etc. This alkali metal phthalate may be added, as such, directly to the crude phthalic converter product before beginning the heat treatment. We prefer, however, to add an alkali metal alkali, such as the hydroxide or carbonate, in amounts of about 0.02% to 0.1% to the crude phthalic anhydride as an aqueous solution before beginning the heat treatment, which results in forming the alkali metal phthalate in situ.

The time of the heat treatment must be governed largely by the amount and type of impurities present in the phthalic anhydride. In general its duration is on the order of about 3–12 hours. We find, however, that with any given crude the presence of catalytic quantities only of alkali metal phthalate reduces the time of heat treatment to from ½ to ⅓ of that which would be necessary if the catalyst were not present. Thus, for example, a converter product obtained by the catalytic air oxidation of naphthalene over a fixed vanadium oxide catalyst at temperatures of 425–500° C. was heat-treated after adding 0.05% of sodium hydroxide, and samples were withdrawn after 8 and 16 hours of heating. Another sample of the same product was heated for 17 hours in the absence of a condensation catalyst. The samples were then subjected to vacuum distillation. The results were as follows:

| Percent NaOH | Hours Refluxed | Vacuum Distillate | | |
|---|---|---|---|---|
| | | Percent of Total Distillate | Color APHA | Heat Test [1] APHA |
| 0.00 | 17 | 0-12 | 75 | |
| | | 12-20 | 50 | 65 |
| | | 20-62 | 35 | |
| | | 62-85 | 20 | 65 |
| 0.05 | 8 | 0-10 | 200 | |
| | | 10-28 | 40 | |
| | | 28-67 | 20 | 35 |
| | | 67-85 | 10 | 25 |
| 0.05 | 16 | 0-9 | 175 | |
| | | 9-17 | 20 | 65 |
| | | 17-50 | 10 | 30 |
| | | 50-82 | 5 | 15 |

[1] Color after 24 hours' heating at 150° C. in sealed glass tube. These results show that the use of 0.05% of caustic reduced the heat treating time requirements to less than ½, since the color and heat tests of the product obtained by refluxing the crude with sodium phthalate for 8 hours were superior to those of the product obtained from the crude refluxed for 17 hours without the catalyst.

A heads cut, which usually amounts to between 1% and 5% of the charge, may be taken either during or after the heat treatment, and is preferably though not necessarily taken off at atmospheric pressure. We have found that a heads cut at this point removes volatile color-forming impurities and also reduces the content of benzoic acid in the final purified phthalic anhydride to a very low figure. That most of the benzoic acid in the crude converter product is removed in the heads cut is shown by our analysis figures; thus, from a naphthalene converter product heated for 12 hours at 280° C. with 0.05% sodium hydroxide a heads cut of 1.8% contained 2-3% of benzoic acid and had a color of 175; an orthoxylene converter product similarly treated produced a heads cut of 2.8% containing almost 25% of benzoic acid and had a color of 400. It will thus be seen that this color removal and benzoic acid removal is an important feature of our invention.

As has been stated, the heat condensation of impurities in the presence of catalytic quantities only of alkali metal phthalate is so effective that the product can be subjected immediately to a final distillation for the production of a commercially pure white phthalic anhydride. In other words, the formerly practiced procedure of subjecting the heat-treated phthalic anhydride to total distillation followed by fractionation of the distillate need no longer be used; the total distillation step can be entirely omitted. Fractionation of the heat-treated product can be carried out either at atmospheric pressure or under a partial vacuum; of these, a vacuum distillation at about 30 mm. of mercury absolute pressure is preferred. Excellent results are obtained with a 1:1 reflux ratio using a column containing from 4 to 6 theoretical plates. The values shown on the drawing were obtained from a naphthalene converter product, having the characteristics of that shown above, by such a vacuum distillation. It will be understood, however, that different results are obtained with other crudes.

It is an important advantage of the present invention that the quantities of residue from the fractional distillation are no greater than those produced by heat treatment in the absence of condensing agents. Moreover, a large proportion of the phthalic anhydride content of these distillation residues can be recovered in a so-called "coke exhauster." This is a simple still wherein the residues are distilled at higher temperatures or lower pressures, or both, than are practical in the fractionation step.

The invention will be further described by the following specific examples. It should be understood, however, that although these examples may describe certain features of the invention in detail, they are given primarily for purposes of illustration and the invention in its broader aspects is not limited thereto.

*Example 1*

A converter product from the catalytic oxidation of naphthalene over a fixed vanadium oxide catalyst at 425-500° C. was condensed in an oil-regulated condenser as described in U. S. Patent No. 2,455,314. A sample of this product was melted and dehydrated and 0.05% by weight of sodium hydroxide was added as a 50% solution, after which refluxing was continued to a liquid temperature of 288° C. The total reflux was then changed to a 6:1 reflux ratio and an overhead fraction was removed until the vapor temperature was 281.5° C., which required about 5 minutes. This procedure was repeated with periodic removals of fractions relatively rich in benzoic acid for a total of 5 hours during which 4.4% of the original charge was taken off as distillate. This cut had an APHA color of 125 and contained 2.7% of benzoic acid. The final liquid and vapor temperatures were 289° C. and 283° C., respectively.

A portion of the charge weighing 1913 grams was then transferred to a still equipped with an agitator and a 2.5-inch by 20-inch packed column and subjected to vacuum fractionation at an absolute pressure of 30 mm. of mercury and with a 1:1 reflux ratio with the following operating conditions and results:

| Time | Temp., ° C. | | Distillate, Grams | Remarks |
|---|---|---|---|---|
| | Liquid | Vapor | | |
| 10:20 | 190 | 169 | | Start. |
| 10:33 | 193 | 169 | 45 | Cut 1. Color 10. Freezing point 130.6° C. |
| 10:55 | 185 | 170 | 1,024 | Cut 2. Color 5. Freezing point 131.0° C. |
| 11:30 | 185 | 170 | 710 | Cut 3. Color 5. Freezing point 130.8° C. |

The heat stability of the products was determined by subjecting a sample of each cut to a standard heat test. This test is carried out by heating the material in a sealed tube for 24 hours at 150° C. and determining its APHA color. Each of cuts 2 and 3 had a color of 10 after heating; the color of cut 1 was 40.

The distillation residue, weighing 134 grams, contained 31.8% of non-volatiles; i. e., material that could not be recovered as phthalic anhydride in a coke exhauster. This corresponds to a loss of only 2.13% as non-volatiles on the original charge.

*Example 2*

Another portion of the charge of Example 1, following removal of the heads cut, was distilled in the same fractionation equipment at atmospheric pressure using a 1:1 reflux ratio. The following table shows the operating conditions and the results obtained:

| Time | Temp., °C. Liquid | Temp., °C. Vapor | Distillate Grams | Distillate Color | Distillate Heat Test | Remarks |
|---|---|---|---|---|---|---|
| 11:20 | 291 | 278 | | | | Charge weighs 1,950 grams. |
| 11:25 | 291 | 278 | 35 | 35 | 65 | Cut 1. F. P. 129.4° C. |
| 1:00 | 292 | 279.5 | 937 | 10 | 15 | Cut 2. F. P. 130.8° C. |
| 2:25 | 295 | 280 | 650 | 5 | 10 | Cut 3. |

The distillation residue weighed 330 grams and contained 11.6% non-volatiles, this being 2% on the weight of the charge.

These results show that high yields of a pure and almost completely colorless phthalic anhydride are obtained with a reflux time of only five hours when 0.05% of sodium hydroxide or the corresponding amount of sodium phthalate is added. Similar results are obtained with other quantities within the range of 0.01% to 0.1% by weight, although the optimum times of heat treatment may be different. It should be noted particularly that the purity and color of the phthalic anhydride of cuts 2 and 3 of both examples is equal to or better than that of the phthalic anhydride of commerce. The process of the present invention therefore produces a commercially acceptable product while reducing the heat treating time and eliminating entirely the total distillation that has heretofore been used.

What we claim is:

1. A method of removing color-forming and odor-forming impurities from crude undistilled phthalic anhydride converter product containing said impurities which comprises heating said undistilled phthalic anhydride converter product at approximately the boiling point thereof for about 3 to 12 hours in the presence of catalytic quantities only of alkali metal phthalate and subjecting the resulting mixture to a fractional distillation including the separate removal of a heads cut relatively rich in benzoic acid, said distillation including passing the vapors of said mixture upwardly in countercurrent contact with a reflux of liquid phthalic anhydride and withdrawing a portion of the overhead distillate so treated as a main cut composed of commercially pure phthalic anhydride.

2. A method according to claim 1 in which the alkali metal phthalate is formed in situ by adding 0.01% to 0.1% of alkali metal hydroxide to the crude phthalic anhydride.

3. A method according to claim 1 in which the fractional distillation is carried out at about 30 millimeters of mercury absolute pressure.

HERBERT J. WEST.
KENNETH GOODEMOOT.

References Cited in the file of this patent

UNITED STATES PATENTS

| Number | Name | Date |
|---|---|---|
| 2,309,167 | Cooper | Jan. 26, 1943 |